United States Patent
Lu

(10) Patent No.: US 8,726,472 B2
(45) Date of Patent: May 20, 2014

(54) POSITIONING AND BINDING BUCKLE

(71) Applicant: Jung-Wen Lu, Taichung (TW)

(72) Inventor: Jung-Wen Lu, Taichung (TW)

(*) Notice: Subject to any disclaimer, the term of this patent is extended or adjusted under 35 U.S.C. 154(b) by 23 days.

(21) Appl. No.: 13/628,294

(22) Filed: Sep. 27, 2012

(65) Prior Publication Data

US 2013/0081233 A1    Apr. 4, 2013

(30) Foreign Application Priority Data

Sep. 30, 2011   (TW) ............................... 100218440 U

(51) Int. Cl.
*B60P 7/06*    (2006.01)
*A44B 99/00*   (2010.01)
*B60P 7/08*    (2006.01)

(52) U.S. Cl.
USPC .......... 24/265 CD; 24/457; 24/583.1; 24/666; 24/667; 410/105

(58) Field of Classification Search
USPC .......... 24/457, 458, 591.1, 593.1, 594.1, 615, 24/666, 667, 697.1, 265 CD, 614, 644, 24/697, 701, 702; 410/105
See application file for complete search history.

(56) References Cited

U.S. PATENT DOCUMENTS

| | | | | |
|---|---|---|---|---|
| 4,771,969 | A * | 9/1988 | Dowd | 244/118.6 |
| 4,796,837 | A * | 1/1989 | Dowd | 244/122 R |
| 4,850,769 | A * | 7/1989 | Matthews | 410/105 |
| 4,932,816 | A * | 6/1990 | Ligensa | 410/105 |
| 5,609,452 | A * | 3/1997 | Looker et al. | 410/105 |
| 5,625,926 | A * | 5/1997 | Berrezouga | 24/265 CD |
| 5,765,978 | A * | 6/1998 | Looker et al. | 410/105 |
| 5,871,318 | A * | 2/1999 | Dixon et al. | 410/105 |
| 6,715,974 | B2 * | 4/2004 | Stotzer et al. | 410/105 |
| 6,902,365 | B1 * | 6/2005 | Dowty | 410/105 |
| 6,918,722 | B1 * | 7/2005 | Girardin | 410/105 |
| 7,204,002 | B2 * | 4/2007 | Kaneko et al. | 24/614 |
| 7,318,695 | B2 * | 1/2008 | Yu et al. | 410/105 |
| 7,517,181 | B2 * | 4/2009 | Dunaway et al. | 410/105 |

* cited by examiner

*Primary Examiner* — Robert J Sandy
*Assistant Examiner* — Louis Mercado
(74) *Attorney, Agent, or Firm* — Wang Law Firm, Inc.; Li K. Wang; Stephen Hsu

(57) ABSTRACT

A positioning and binding buckle includes a main body and a positioning element, and the main body is formed by bending a plate to form two side plates and a connecting portion, and a hollow is formed between the two side plates and two stop portions are formed at the bottom of the two side plates and passed through a buckle hole a containing hole containing a compression spring, and positioning element is disposed across the two side plates by its cut groove and limited between at least two opposite lugs, and the positioning element is passed through the containing hole by an insert pin and pushed by the bottom edge of the compression spring, and the positioning element can be lifted towards the connecting portion and pushed back by the compression spring, such that the bottom is aligned evenly with the stop portion.

4 Claims, 9 Drawing Sheets

POSITIONING AND BINDING BUCKLE

FIELD OF THE INVENTION

The present invention relates to a buckle structure, in particular to the buckle structure capable of positioning and binding goods.

BACKGROUND OF THE INVENTION

With reference to FIG. 9 for a conventional buckle structure for binding goods, the conventional buckle structure comprises a main body 90 having a buckle hole 91, two stop portions 92 disposed at the bottom of the main body, and a positioning element 93 disposed across the main body 90 and provided for lifting the main body 90 and returning to its original position automatically after being released. When the buckle structure is used, the positioning element 93 is lifted to install the two stop portions 92 of the main body 90 into two concave holes 95 of a guide rail 94 respectively, and the main body 90 is shifted slightly to dislocate the two stop portions 92 with the concave holes 95. Now, the positioning element 93 is aligned precisely with a concave hole 95 to release the positioning element 93 and allow the positioning element 93 to be sunk into the concave hole 95. In FIG. 10, the main body 90 is fixed onto the guide rail 94 by the two stop portions 92 and the positioning element 93.

In general, the main body 90 of the conventional buckle structure of this sort is made of metal, and the main body 90 is a solid structure, and thus incurring a higher material cost and a higher manufacturing cost for casting the main body 90. In view of the aforementioned problems, the inventor of the present invention provides an improved buckle structure to overcome the problems of the prior art.

SUMMARY OF THE INVENTION

Therefore, it is a primary objective of the present invention to overcome the problems of the prior art by providing a positioning and binding buckle with an improved structure to save the consumption of metal materials and simplify the manufacturing process, so as to reduce the manufacturing cost.

To achieve the foregoing objective, the present invention provides a positioning and binding buckle, comprising:

a main body, formed by bending a plate which is cut according to a predetermined shape of the buckle to produce two side plates disposed parallel with each other and the top of the two side plates being coupled by a connecting portion, and a hollow being formed between the two side plates, and two stop portions being formed by bending the bottom of the two side plates outward and having an interval apart from each other, and the two side plates having a buckle hole formed and passed through the two stop portions, and the two side plates having a containing hole passing through the two stop portions for containing a compression spring, and the two side plates having at least two opposite lugs disposed on both sides of the containing hole respectively, and each lug being formed by squeezing two slits of the side plate outward;

a positioning element, having a bottom substantially in a cylindrical shape, a cut groove concavely formed at the bottom and disposed across two side plates through a connecting portion of the main body, and limited between at least two opposite lugs, and the positioning element being passed through from the bottom of the containing hole by an insert pin and pushed by a bottom end of the compression spring, and the positioning element being lifted towards the connecting portion and pushed back by the compression spring, such that the bottom is aligned evenly with the stop portion.

DESCRIPTION OF THE PREFERRED EMBODIMENTS

With reference to FIGS. 1 to 6, embodiments are provided for the purpose of illustrating the present invention only, but not intended for limiting the scope of the present invention.

Figure 1:
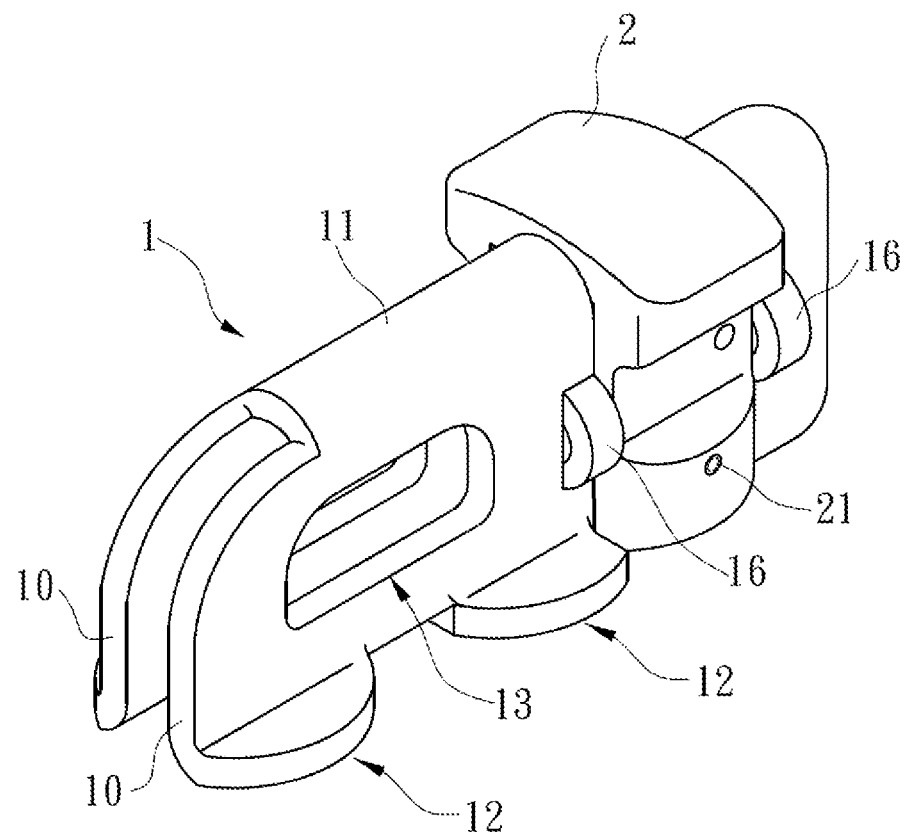
FIG. 1 is a perspective view of the present invention.
Figure 2:
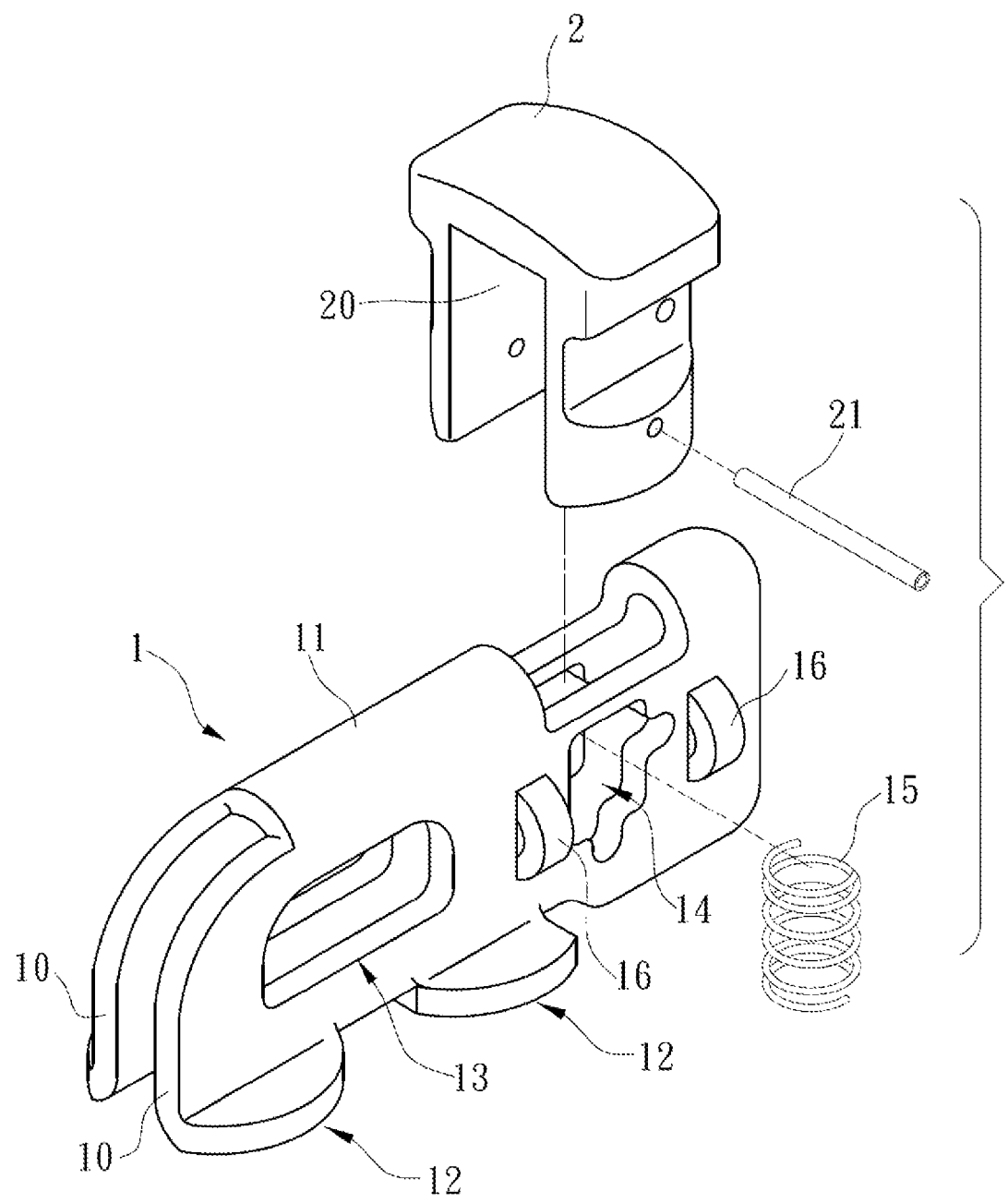
FIG. 2 is an exploded view of the present invention.
Figure 3:
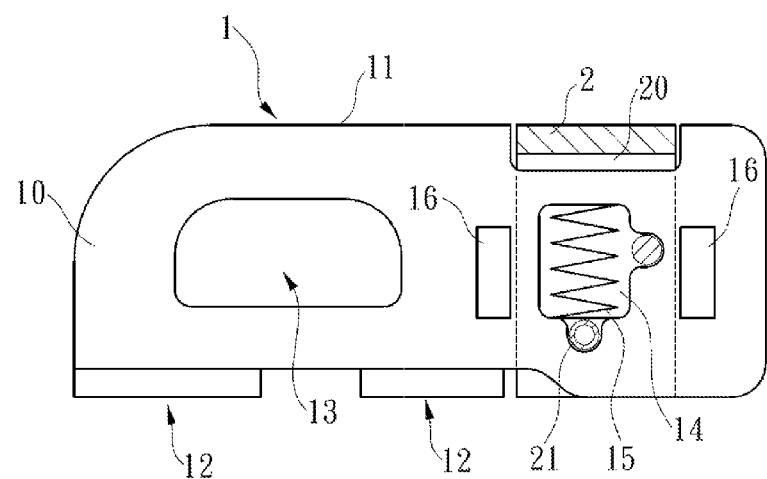
FIG. 3 is a cross-sectional view of the present invention.

In a preferred embodiment, a positioning and binding buckle as shown in FIGS. 1 to 3 comprises a main body 1 and a positioning element 2.

Figure 4:
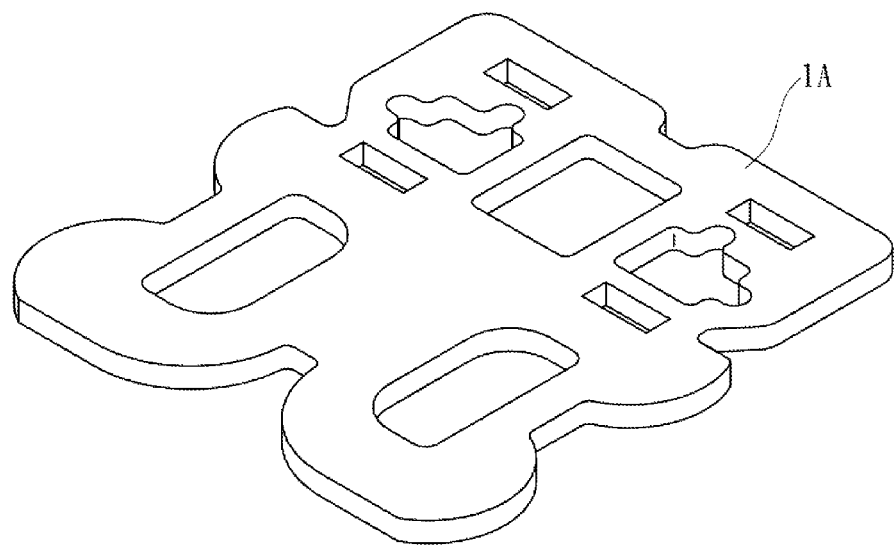
FIG. 4 is a schematic view of a plate structure of the present invention.

Before the main body 1 is bent and formed, a plate 1A as shown in FIG. 4 is provided, and the plate 1A is pre-cut according to a predetermined shape of the buckle. In FIGS. 1 and 2, the main body 1 is formed by bending the plate 1A into two parallel side plates 10 and the top of the side plates 10 is coupled by a connecting portion 11. Since the main body 1 is formed by bending the plate 1A, therefore a hollow is formed between the two side plates 10, and the bottoms of the two side plates 10 are folded sideway respectively to form two stop portions 12, wherein a gap is formed between the two stop portions 12, and the two side plates 10 have a buckle hole 13 passing through the two stop portions 12, and the two side plates 10 have a containing hole 14 penetrating through the two stop portions 12 and provided for containing a compression spring 15, and the two side plates 10 have two lugs 16 disposed on both sides of the containing hole 14 respectively, and each lug 16 is formed at a predetermined position on the side plate to form two slits, and a portion in the two slits is squeezed outwardly to form the lug 16.

In FIGS. 1 to 3, the bottom of the positioning element 2 is in a cylindrical shape and has a cut groove 20 formed thereon, and the cut groove is cut from the bottom of the positioning element 2 and passed through the connecting portion 11 of the main body 1 and disposed across the two side plates 10, and the positioning element 2 is installed from the lug 16 and positioned into the lug 16, wherein the positioning element 2 is passed through from the bottom of the containing hole 14 by an insert pin 21, and the insert pin 21 is pushed by the bottom of the compression spring 15, and the positioning element 2 can be lifted towards the connecting portion 11, and pushed back by the compression spring 15, so that the bottom is aligned evenly with the stop portion 12.

Figure 5:
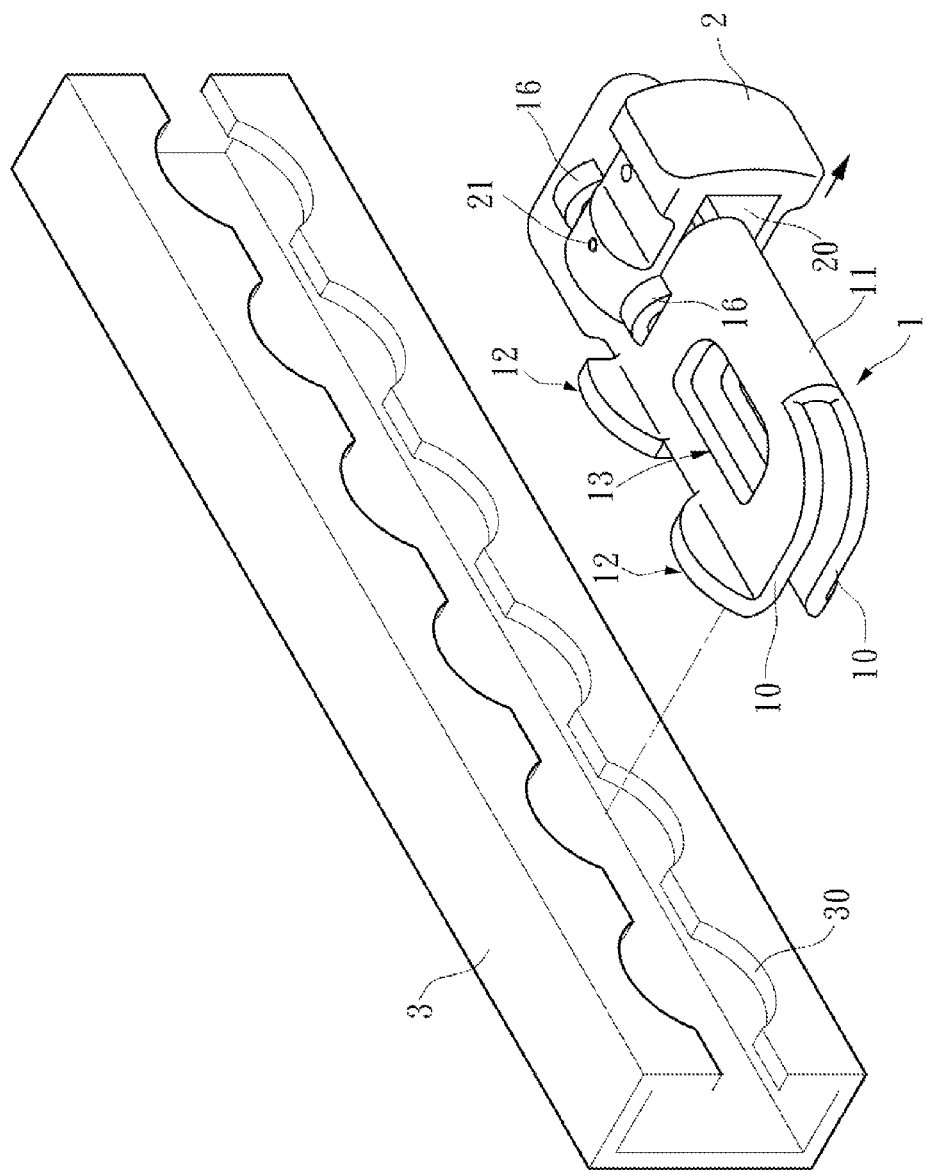
FIG. 5 is a schematic view of installing a buckle of the present invention onto a guide rail.
Figure 6:
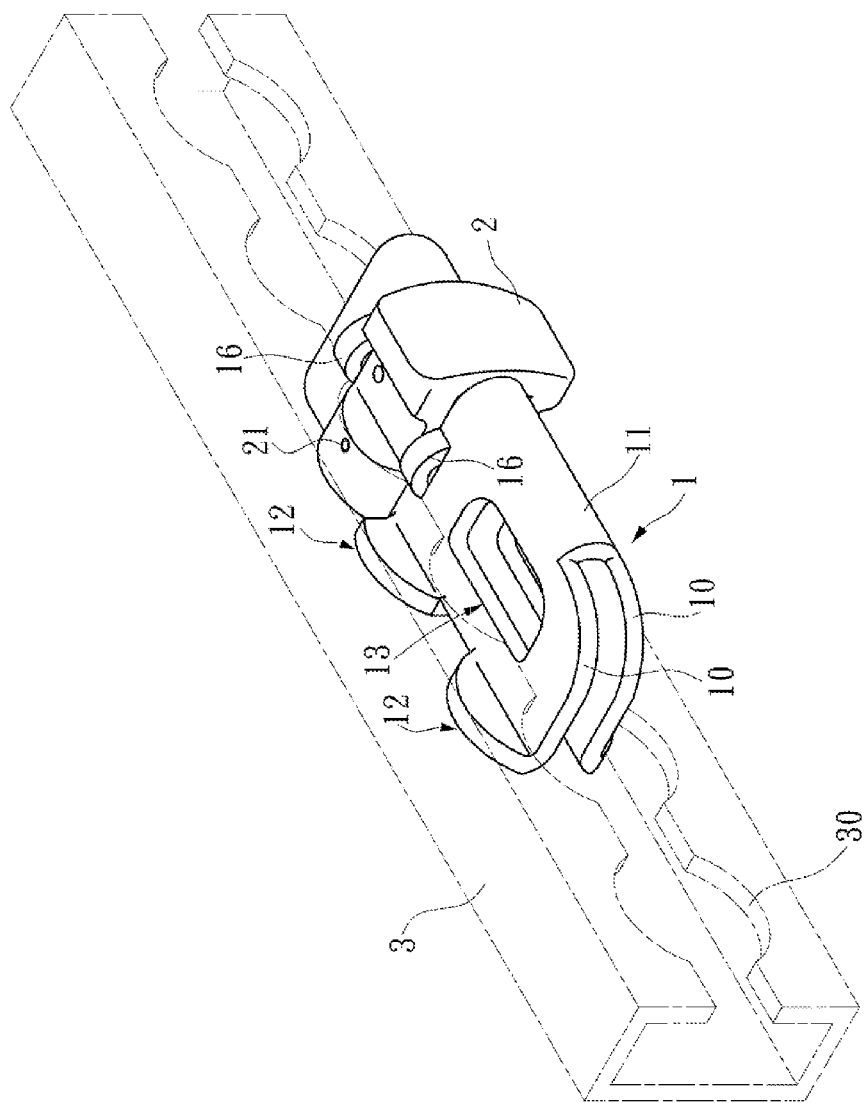
FIG. 6 is a schematic view of positioning a buckle of the present invention onto a guide rail.

In FIG. 5, the buckle structure must be used together with the guide rail 3 as shown in the figure, wherein the guide rail 3 has a plurality of concave holes 30 arranged in a row, and the concave holes 30 are interconnected with one another. When it is necessary to fix the main body to the guide rail 3, the positioning element 2 is lifted to place the two stop portions 12 of the main body 1 into the two concave holes 30 of the guide rail 3 respectively, and the main body 1 is shifted slightly to dislocate the two stop portions 12 from the concave holes 30. Now, the positioning element 2 is aligned precisely with a concave hole 30 to release the positioning element 2 and sink the positioning element 2 into the concave hole 30 as shown in FIG. 6, and the main body 1 can be sunk into the concave hole 30 by the bottoms of two stop portions 12 and the positioning element 2 to fix the main body 1 onto the guide rail 3.

Compared with a conventional buckle structure, the present invention has the main body 1 made by bending the plate 1A, so that a hollow is formed between the two side plates 10. Similarly, structures including the stop portion 12, the buckle hole 13 and the containing hole 14 can be formed, and a slit is provided for forming the lug 16 by squeezing and disposing the positioning element 2, so that when the main body 1 of the present invention is manufactured, the consumption of metal material can be saved, and the way of forming the main body 1 by bending the plate 1A can lower the manufacturing cost.

Figure 7:
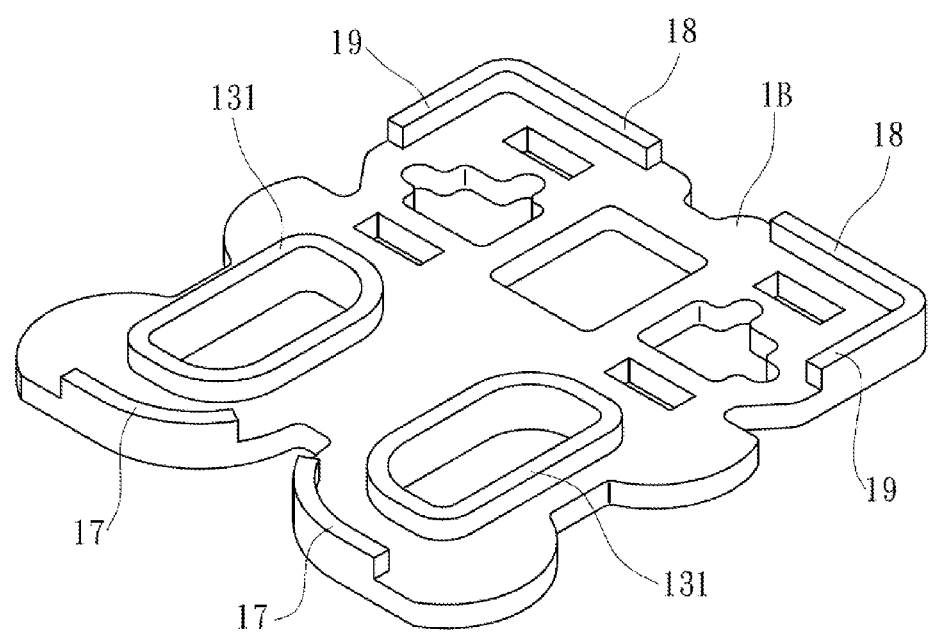
FIG. 7 is a schematic view of a plate structure in accordance with another embodiment of the present invention.
Figure 8:
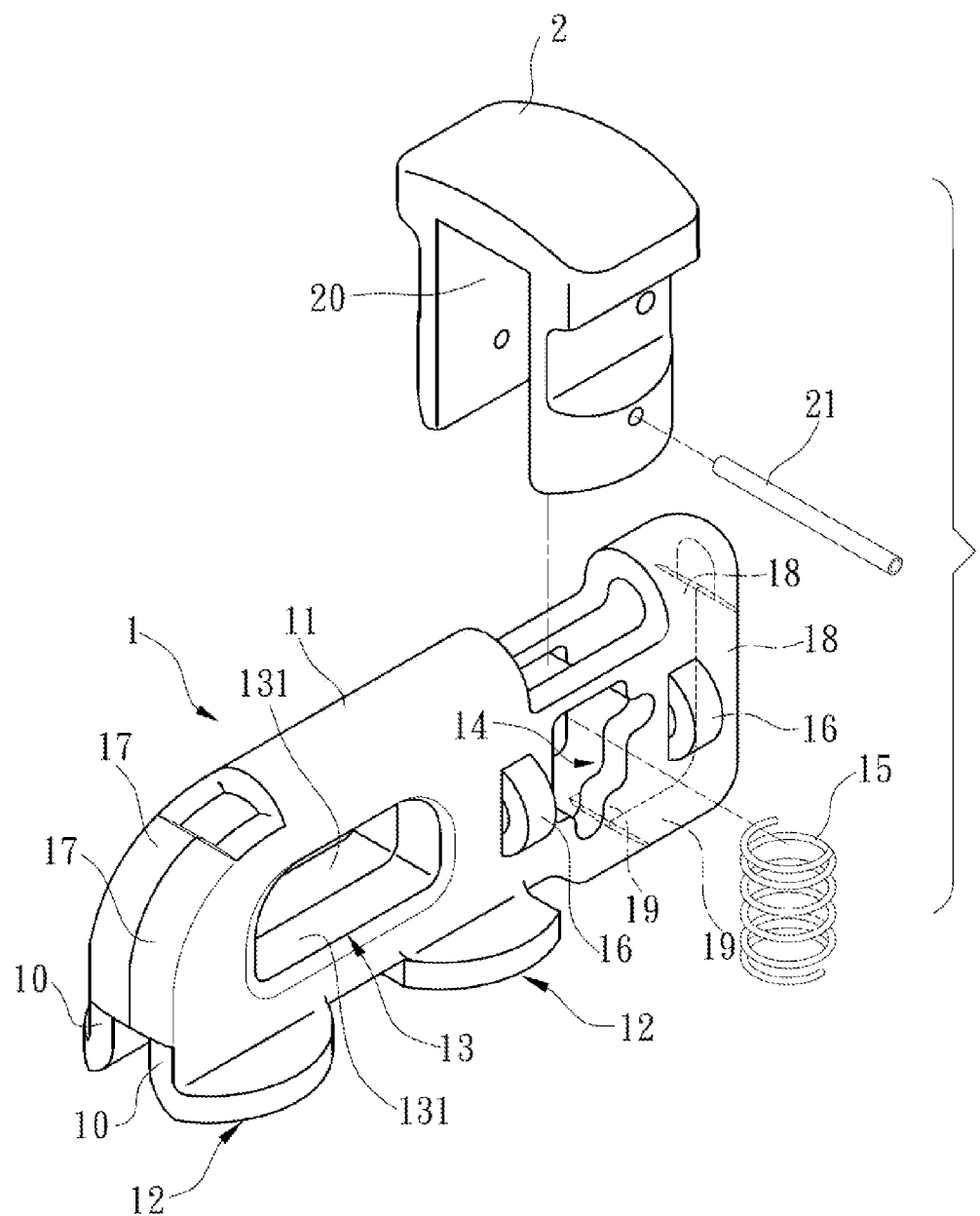
FIG. 8 is an exploded view of another embodiment of the present invention.
Figure 9:
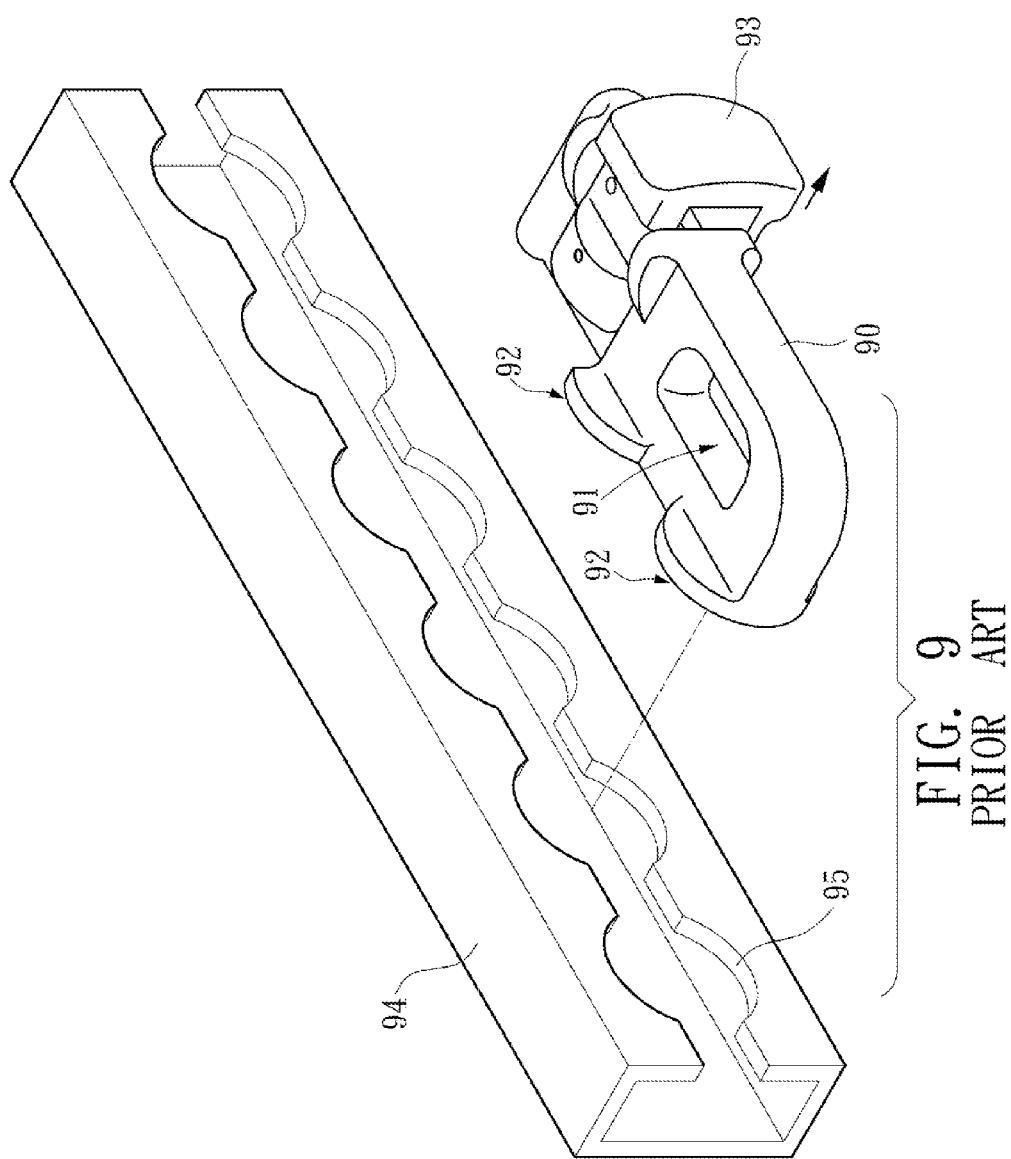
FIG. 9 is a schematic view of installing a conventional buckle onto a guide rail.
Figure 10:
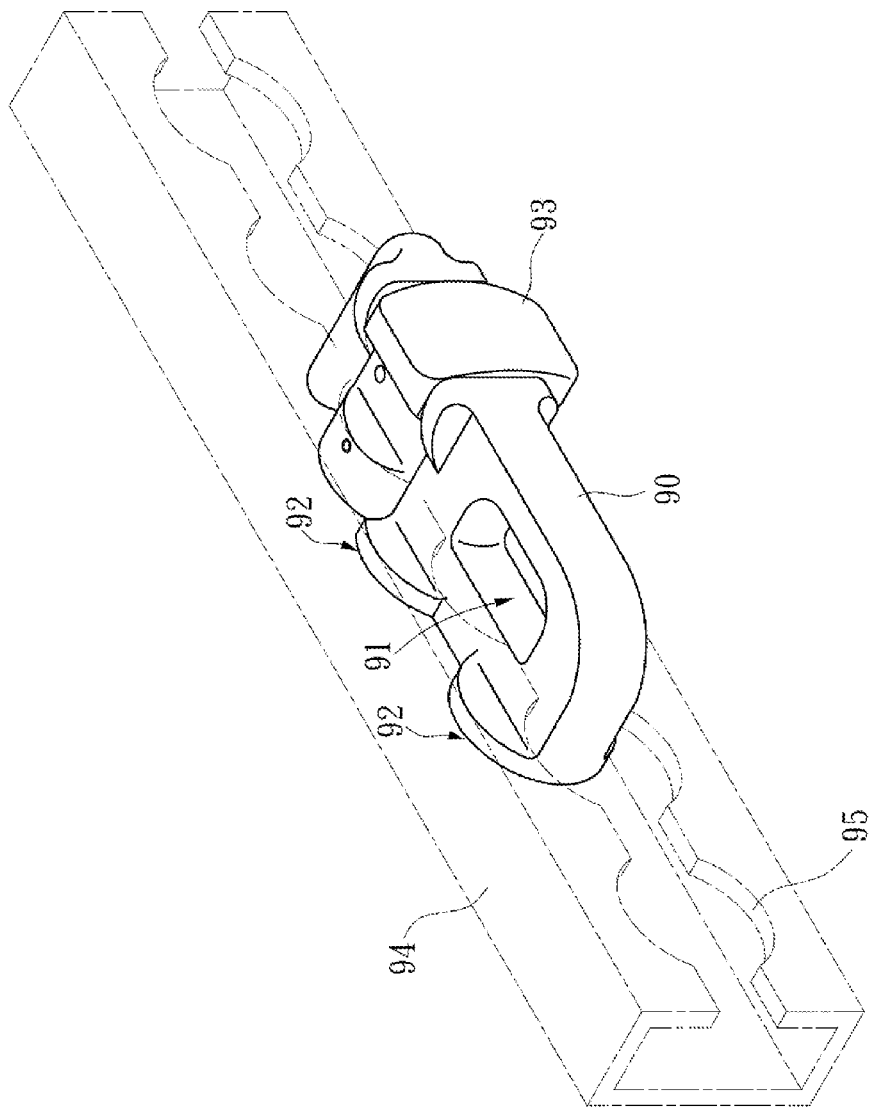
FIG. 10 is a schematic view of positioning a conventional buckle onto a guide rail.

With reference to FIGS. 7 and 8 for another preferred embodiment of the present invention respectively, the difference between this embodiment and the previous embodiment resides on that the two side plates 10 of this embodiment have a stop edge 17, 18 formed separately by bending two opposite sides other than the top and the bottom inward, and the two side plates 10 have a flange 19 formed by bending the bottom of the containing hole 14 inward, and the internal edges of the two buckle holes 13 are bent inwardly sideway to form a circular protrusion 131, and when the main body 1 is formed by bending a plate 1B, the stop edges 17, 18 of the two side plates 10 abut each other between the two side plates 10, the flanges 19 on the two side plates 10 abut each other between the two side plates 10, and the circular protrusions of the two buckle holes 13 abut each other between the two side plates 10. Therefore, the structural strength between the main body 1 and the two side plates 10 can be enhanced for preventing them from being deformed by compression easily, and the circular protrusions 131 formed by bending the two buckle holes 13 inward further provides a substantially circular arc edges and corners of the two buckle holes 13 to assure that a string or a strap can be passed through or wound around the two buckle holes 13 easily without wearing out or breaking the string or the strap.

What is claimed is:

1. A positioning and binding buckle, comprising:
a main body, formed by bending a plate which is cut according to a predetermined shape of the buckle to produce two side plates disposed parallel with each other and a top of the two side plates being coupled by a connecting portion, and a hollow being formed between the two side plates, and two stop portions being formed by bending a bottom of the two side plates outward and having an interval apart from each other, and the two side plates having a buckle hole formed and passed through the two stop portions, and the two side plates having a containing hole passing through the two stop portions for containing a compression spring, and the two side plates having at least two opposite lugs disposed on both sides of the containing hole respectively, and each lug being formed by squeezing two slits of the side plate outward;
a positioning element, having a bottom substantially in a cylindrical shape, a cut groove concavely formed at the bottom and disposed across two side plates through the connecting portion of the main body, and limited between at least two opposite lugs, and the positioning element being passed through from the bottom of the containing hole by an insert pin and pushed by a bottom end of the compression spring, and the positioning element being lifted towards the connecting portion and pushed back by the compression spring, such that the bottom is aligned evenly with the stop portions.

2. The positioning and binding buckle of claim 1, wherein the two side plates have a stop edge separately formed by bending two opposite sides other than the top and the bottom of the two side plates, and the two stop edges abut each other between the two side plates.

3. The positioning and binding buckle of claim 2, wherein the two side plates have a flange separately formed by bending the bottom of the containing hole inward, and the two flanges abut each other between the two side plates.

4. The positioning and binding buckle of claim 1, further comprising a circular protrusion formed by bending an internal rim of each buckle hole inward, and the two circular protrusions abut each other between the two side plates.

\* \* \* \* \*